United States Patent
Bolus

(10) Patent No.: US 9,947,490 B2
(45) Date of Patent: Apr. 17, 2018

(54) ELECTRICAL CIRCUIT SWITCHING

(71) Applicant: uBeam Inc., Santa Monica, CA (US)

(72) Inventor: Jonathan Bolus, Santa Monica, CA (US)

(73) Assignee: uBeam Inc., Santa Monica, CA (US)

( * ) Notice: Subject to any disclaimer, the term of this patent is extended or adjusted under 35 U.S.C. 154(b) by 228 days.

(21) Appl. No.: 14/927,181

(22) Filed: Oct. 29, 2015

(65) Prior Publication Data

US 2017/0125184 A1   May 4, 2017

(51) Int. Cl.
*H01H 9/54* (2006.01)

(52) U.S. Cl.
CPC .................................... *H01H 9/54* (2013.01)

(58) Field of Classification Search
CPC ......... F16P 3/20; H03K 17/102; H01H 9/542; H01H 59/0009; H02M 1/088
USPC .......................................................... 307/113
See application file for complete search history.

(56) References Cited

U.S. PATENT DOCUMENTS

| 5,894,413 | A | 4/1999 | Ferguson |
| 7,477,082 | B2 | 1/2009 | Fukazawa |
| 7,545,369 | B1 * | 6/2009 | Lan .................. G09G 3/3406 315/209 R |
| 2005/0218825 | A1 * | 10/2005 | Chiou ............... H05B 41/2824 315/209 R |
| 2009/0195235 | A1 * | 8/2009 | Stoltz .................... H03K 17/08 323/311 |
| 2013/0134786 | A1 | 5/2013 | Ishigaki et al. |
| 2014/0211345 | A1 | 7/2014 | Thompson et al. |
| 2014/0217827 | A1 | 8/2014 | Cheek et al. |
| 2014/0268928 | A1 | 9/2014 | Wei et al. |
| 2016/0111989 | A1 * | 4/2016 | Gohara .................... H02P 3/12 318/490 |

FOREIGN PATENT DOCUMENTS

JP   2013158067 A   *   8/2013

OTHER PUBLICATIONS

International Search Report and Written Opinion dated Feb. 24, 2017 as received in Application No. PCT/US2016/059470.

* cited by examiner

*Primary Examiner* — Quan Tra
(74) *Attorney, Agent, or Firm* — Morris & Kamlay LLP

(57) ABSTRACT

Systems and techniques are provided for electrical circuit switching. An electrical load may be connected to a voltage supply with current flow entering a first terminal of the electrical load. The electrical load may be disconnected from the voltage supply. The electrical load may be connected to ground such that the electrical load discharges. The electrical load may be connected to the voltage supply with current flow entering a second terminal of the electrical load. The electrical load may be disconnected from the voltage supply. The electrical load may be connected to ground such that the electrical load discharges.

18 Claims, 8 Drawing Sheets

ELECTRICAL CIRCUIT SWITCHING

BACKGROUND

A circuit, such as an H-bridge circuit, may be used to drive an electrical load. An H-bridge circuit may allow an electrical load to have a current from a voltage supply supplied to the electrical load in alternate directions through the use of switches. This may allow, for example, an electric motor to be driven in both forward and reverse by a DC power source.

BRIEF SUMMARY

According to embodiments of the disclosed subject matter, an electrical load may be connected to a voltage supply with current flow entering a first terminal of the electrical load. The electrical load may be disconnected from the voltage supply. The electrical load may be connected to ground such that the electrical load discharges. The electrical load may be connected to the voltage supply with current flow entering a second terminal of the electrical load. The electrical load may be disconnected from the voltage supply. The electrical load may be connected to ground such that the electrical load discharges.

An electrical load may be connected to an intermediate voltage supply with current flow entering a first terminal of the electrical load. The electrical load may be disconnected from the intermediate voltage supply. The electrical load may be connected to a primary voltage supply with current flow entering the first terminal of the electrical load. The electrical load may be disconnected from the primary voltage supply. The electrical load may be disconnected to the intermediate voltage supply with current flow entering the intermediate voltage supply from the first terminal of the electrical load. The electrical load may be disconnected from the intermediate voltage supply. The electrical load may be connected to ground such that the electrical load discharges. The electrical load may be connected to the intermediate voltage supply with current flow entering a second terminal of the electrical load. The electrical load may be disconnected from the intermediate voltage supply. The electrical load may be connected to the primary voltage supply with current flow entering the second terminal of the electrical load. The electrical load may be disconnected from the primary voltage supply. The electrical load may be connected to the intermediate voltage supply with current flow entering the intermediate voltage supply from the second terminal of the electrical load. The electrical load may be disconnected from the intermediate voltage supply. The electrical load may be connected to ground such that the electrical load discharges.

Systems and techniques disclosed herein may allow for electrical circuit switching. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1A:
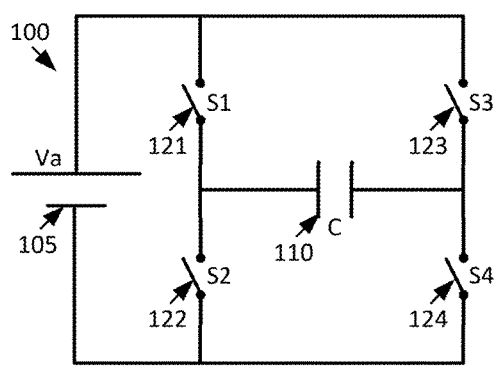
FIGS. 1A-1F show an example circuit suitable for electrical circuit switching according to an implementation of the disclosed subject matter.

According to embodiments disclosed herein, an H-bridge electrical circuit may be switched to drive an electrical load. The H-bridge circuit may be switched to discharge the electrical load before the direction of the current from a primary voltage supply relative to the electrical load is switched. The electrical load may be discharged to ground, or may be routed to an intermediary voltage supply. The intermediary voltage supply may recover energy when the electrical load is discharged, and the H-bridge circuit may be switched to supply the recovered energy from the intermediary voltage supply back to the electrical load when the DC current switches directions relative to the electrical load. The current from the intermediary voltage supply may be supplied to the electrical load in the same direction as the DC current from the primary voltage supply.

Electrical circuit switching may be used to control the operation of an H-bridge circuit. An H-bridge circuit may be a circuit that allows, using a number of switches, for a current to be supplied to an electrical load in both directions. Opening and closing the proper switches may change the direction of the current relative to the electrical load. When the H-bridge circuit is switched to supply current in a first direction, the positive voltage may be applied to first terminal of the electrical load. When the H-bridge circuit is switched to supply current in a second direction, the positive voltage may be applied to the second terminal of the electrical load. For example, the electrical load may be an electric motor. Current may be supplied to the electric motor in the first direction to cause the electric motor to rotate in a forward direction. The switches of the H-bridge circuit may then be opened and closed to supply the current to the electric motor in a second direction, opposite the first direction, to cause the electric motor to rotate in a backwards direction.

When the current is supplied in the first direction, the voltage at the electrical load may be considered positive, and when the current is supplied in the second direction, the voltage at the electrical load may be considered negative.

For example, a capacitive load, such as a capacitor, fully charged by a current from a primary voltage supply of 5 volts may be considered to have a potential of +5V when the current is supplied in the first direction by the H-bridge circuit, and of −5V when the current is supplied in the second direction. This may result in a swing of +/−10 volts at the capacitive load when the H-bridge circuit is switched to change the direction of the current, driven by the primary voltage supply.

The switching sequence used by the H-bridge circuit may allow the electrical load to discharge any remaining energy to ground before the direction of the current supplied to the electrical load changes directions. After having current supplied to it in the first direction, the electrical load may be disconnected from the primary voltage supply, and may be connected to a circuit that's connected to ground. Any remaining energy in the electrical load may discharge to ground, until the electrical load reaches a potential of 0 volts. The switches of the H-bridge may then be set to reconnect to the electrical load to the primary voltage supply, with the current supplied in the second direction. Before the current supplied to the electrical load is switched back to the first direction, the electrical load may again be disconnected from the primary voltage supply and connected to ground, and may discharge to 0 volts before being reconnected to the primary voltage supply with the current supplied in the first direction.

For example, a parallel plate capacitor connected to the primary voltage supply of 5 volts may be charged to a potential of +5V with the H-bridge switches set to supply current to the capacitor in the first direction. The potential of +5V may indicate that a first capacitor plate is connected to the positive terminal of the primary voltage supply while a second capacitor plate is connected to the negative terminal of the primary voltage supply. The H-bridge switches may then be set to disconnect the capacitor from the primary voltage supply and connect the capacitor to a circuit connected to ground. The capacitor may discharge any remaining stored charged to ground. The capacitor may discharge to ground from +5V to 0V. The capacitor may then be reconnected to the primary voltage supply with the current supplied in the second direction, charging the capacitor to a potential of −5V. The −5V potential may indicate that the first plate is connected to the negative terminal of the primary voltage supply while the second plate is connected to the positive voltage supply. The H-bridge switches may again disconnect the capacitor from the primary voltage supply and connect the capacitor to a circuit connected to ground. The capacitor may discharge any remaining charge to ground, for example, discharging from −5V to 0V, and then be reconnected to the primary voltage supply with the current supplied in the first direction.

Discharging to ground before switching the direction of the current supplied to the electrical load may reduce the amount of power used from the primary voltage supply to swing the electrical load between its highest magnitude positive and negative voltages. For example, with a 5 volt voltage supply, the voltage supply may only need to drive the capacitor from 0V to +5V, and from 0V to −5V, instead of from −5V to 5V and 5V to −5V, reducing the amount of power used from the voltage supply. The total power consumption of an H-bridge may be given by:

$$P=2Ef \quad (1)$$

where P is total power consumption, f is the frequency with which current switches directions, and E is the energy drawn from the primary voltage supply by the electrical load to reach its maximum magnitude voltage. For a capacitor in an H-bridge circuit that doesn't discharge the electrical load before switching the direction of the supplied current, this may be given by:

$$E=2CV_A^2 \quad (2)$$

where C is the capacitance of the capacitor and $V_A$ is the voltage of the primary voltage supply, resulting in the total power consumption being given by:

$$P=4CV_A^2 f \quad (3)$$

In an H-bridge circuit that discharges the electrical load before switching the direction of the supplied current, the energy drawn from the primary voltage supply by a capacitor may be given by:

$$E=CV_A^2 \quad (4)$$

which may result in a total power consumption of:

$$P=2CV_A^2 f \quad (5)$$

An H-bridge circuit may have a primary voltage supply with a voltage of $V_A$, an electrical load, and four switches. The first switch may connect the positive terminal of the primary voltage supply to the first terminal of the electrical load. The second switch may connect the negative terminal of the primary voltage supply to the first terminal of the electrical load. The third switch may connect the positive terminal of the primary voltage supply to the second terminal of the electrical load. The fourth switch may connect the negative terminal of the primary voltage supply to the second terminal of the electrical load. The switching sequence for the H-bridge circuit may start with the first switch and fourth switch closed. The electrical load may be charged to $+V_A$. The first switch may be opened and the second switch may be closed, disconnecting the electrical load from the primary voltage supply and creating a circuit between the first terminal and second terminal of the electrical load through the ground with no other voltage source. The electrical load may discharge to ground, from $+V_A$ to 0V. The fourth switch may be opened, and the third switch may be closed, connecting the second terminal of the electrical load to the positive terminal of the primary voltage supply while the second switch connects the first terminal of the electrical load to the negative terminal of the primary voltage supply. The electrical load may be charged from 0V to $-V_A$. The third switch may be opened and the fourth switch may be closed, disconnecting the electrical load from the primary voltage supply and recreating the circuit through the ground with no voltage source besides the electrical load. The electrical load may be discharged to ground, going from $-V_A$ back to 0V. The second switch may be opened and the first switch may be closed, resulting in the first switch and fourth switch being closed and the electrical load being charged back to $+V_A$.

An H-bridge circuit may include a modified driver circuit and an intermediary voltage supply. The intermediary voltage supply may supply a current, and may be any suitable form of rechargeable electrical storage, such as a rechargeable battery or capacitor, with any suitable capacity. For example, the intermediary voltage supply may have a much larger capacity than the electrical load. The intermediary voltage supply may be connected through switches such that either terminal of the electrical load of the H-bridge circuit may be connected to a first terminal of the intermediary voltage supply, while the second terminal of the intermediary voltage supply may be connected ground. The primary voltage supply may have its positive terminal connected directly to the rest of the H-bridge circuit and its negative terminal connected to ground.

The intermediary voltage supply may supply current to an electrical load in the first direction, discharging until the voltage level of the electrical load equals the voltage level of the intermediary voltage supply. The electrical load may then be disconnected from the intermediary voltage supply and connected to the primary voltage supply, which may also supply current to the electrical load in the first direction until the electrical loads voltage level equals the voltage level of the primary voltage supply. The electrical load may then be disconnected from the primary voltage supply, and reconnected to the intermediary voltage supply. The electrical load may discharge some of its remaining energy into the intermediary voltage supply until the voltage levels equalize, storing some of the electrical load's remaining charge in the intermediary voltage supply. The electrical load may then be disconnected from the intermediary voltage supply and may be connected to a circuit that's connected to ground with no other voltage source. Any remaining energy in the electrical load may discharge to ground, until the electrical load reaches a potential of 0 volts. The switches of the H-bridge may then be set to reconnect to the electrical load to the intermediary voltage supply, which may charge the electrical load with the stored energy that was received from the electrical load. The current from the intermediary voltage supply may be supplied to the electrical load in the second direction. In this way, some of the energy that was used to charge the electrical load when the current was supplied in the first direction may have been recaptured and reused to charge the electrical load with current supplied in the second direction. After the voltage levels between the electrical load and the intermediary voltage supply equalizes, the electrical load may be disconnected from the intermediary voltage supply and reconnected to the primary voltage supply, which may supply current to the electrical load in the second direction. The electrical load may then be disconnected from the primary voltage supply and reconnected to the intermediary voltage supply. The electrical load may discharge into the intermediary voltage supply until voltage levels equalize, and then be disconnected from the intermediary voltage supply and connected to ground with no other voltage source. The electrical load may discharge to 0 volts before being reconnected to the intermediary voltage supply with the current supplied in the first direction.

For example, a parallel plate capacitor may be part of an H-bridge circuit with intermediary voltage supply that may be a storage capacitor, and a primary voltage supply of 5 volts. The storage capacitor may have a potential of 2.5V which may be supplied to capacitor has either positive or negative voltage depending on the configuration of the H-bridge switches. The capacitor may be connected to the storage capacitor, and may charge to a potential of +2.5V with the H-bridge switches set to supply current to the capacitor in the first direction. The capacitor may be disconnected from the storage capacitor and be connected to the primary voltage supply, with current supplied in the first direction, charging the capacitor from +2.5 V to +5V. The capacitor may be disconnected from the primary voltage supply and reconnected to the storage capacitor, discharging from +5V to +2.5V. The energy discharged by the capacitor may be stored in the storage capacitor. The capacitor may be disconnected from the storage capacitor and may discharge any remaining stored charge to ground, from +2.5V to 0V. The capacitor may then be reconnected to the storage capacitor with the current supplied in the second direction, charging the capacitor to a potential of −2.5V. The H-bridge switches may again disconnect the capacitor from the storage capacitor and connect the capacitor to the primary voltage supply, with the current supplied to the capacitor in the second direction. The capacitor may charge from −2.5V to −5V. The capacitor may be disconnected from the primary voltage supply and reconnected to the storage capacitor, discharging into the storage capacitor from −5V to −2.5V. The capacitor may be disconnected from the storage capacitor and connected to ground with no other voltage source, discharging from −2.5V to 0V, and then reconnected to the storage capacitor with the current supplied in the first direction.

Discharging to a second voltage supply and to ground before switching the direction of the current supplied to the electrical load may reduce the amount of power used from the primary voltage supply to swing the electrical load between its highest magnitude positive and negative voltages. For example, with a 5 volt voltage supply, the voltage supply may only need to drive the capacitor from +2.5V to +5V, and from −2.5V to −5V, instead of from −5V to 5V and 5V to −5V, reducing the amount of power used from the voltage supply. The total power consumption of an H-bridge with a modified drive circuit and intermediary voltage supply may be given by:

$$P = 2CV_A^2(2k^2 - 2k + 1)f \qquad (6)$$

where P is total power consumption, f is the frequency with which current switches directions, C is the capacitance of the capacitor or electrical load, $V_A$ is the voltage of the primary voltage supply, and k is the fraction of the voltage of the primary voltage supply provided by the intermediary voltage supply, where 0>k>1. When k=0.5, total power consumption may be given by:

$$P = CV_A^2 f \qquad (7)$$

When k=0.5, the net charge drawn from the intermediary voltage supply per cycle of the H-bridge may be 0. There may be no net power delivered by the intermediary voltage supply. The intermediary voltage supply may not need to be voltage regulator circuit, and may be a storage capacitor.

Additional intermediary voltage supplies may be added to the H-bridge circuit. Each additional intermediary voltage supply may be connected to the H-bridge circuit through its own set of switches. With N linearly spaced total voltage supplies, including the primary voltage supply and intermediary voltage supplies with k=0.5, the power consumption of the H-bridge may be given by:

$$P = \frac{2CV_A^2 f}{N} \qquad (6)$$

An H-bridge circuit with a modified driver circuit and an intermediary voltage supply may have a primary voltage supply with a voltage of $V_A$, an electrical load, an intermediary voltage supply with a voltage of $kV_A$ and six switches. The first switch may connect the positive terminal of the primary voltage supply to the first terminal of the electrical load. The second switch may connect the first terminal of the electrical load to the first terminal of the intermediary voltage supply. The third switch may connect the first terminal of the electrical load to ground. The fourth switch may connect the positive terminal of the primary voltage supply to the second terminal of the electrical load. The fifth switch may connect the first terminal of the intermediary voltage supply to the second terminal of the electrical load. The sixth switch may connect the second terminal of the electrical load to ground. The negative terminal of the primary voltage supply may be connected to ground, and the second terminal of the intermediary voltage supply may be connected to ground. When the intermediary voltage supply is a capacitor, the negative terminal of the capacitor may be connected ground.

The switching sequence for the H-bridge circuit with a modified driver circuit and intermediate voltage supply may start with the third switch and sixth switch closed. The electrical load may be at, or discharged to, 0V. The third switch may be opened and the second switch may be closed, connecting the electrical load to the intermediary voltage supply through ground. The intermediary voltage supply may have a voltage of $kV_A$, and the electrical load may charge from 0V to $+kV_A$. The second switch may be opened and the first switch may be closed, connecting the electrical load to primary voltage supply though the ground with the current being supplied to the electrical load in the first direction. The primary voltage supply may have a voltage of $V_A$. The electrical load may charge from $kV_A$ to $V_A$. The first switch may be opened and the second switch may be closed, disconnecting the electrical load from the primary voltage supply and connecting the electrical load to the intermediary voltage supply through ground. The electrical load may discharge from $V_A$ to $kV_A$, and the intermediary voltage supply may recapture this energy. The second switch may be opened and the third switch may be closed, disconnecting the electrical load from the intermediary voltage supply and connecting the electrical load to ground. The electrical load may discharge from $kV_A$ to 0V to ground. The sixth switch may be opened and the fifth switch may be closed, connecting the electrical load to the intermediary voltage supply. The electrical load may charge from 0V to $-kV_A$, as the voltage of the intermediary voltage supply of $kV_A$ may generate a current that is supplied to the electrical load in the second direction. The fifth switch may be opened and the fourth switch may be closed, disconnecting the electrical load from the intermediary voltage supply and connecting the electrical load to the primary voltage supply. The electrical load may charge from $-kV_A$ to $-V_A$. The fourth switch may be opened and the sixth switch may be closed, disconnecting the electrical load from the primary voltage supply and connecting the electrical load to the intermediary voltage supply through ground. The electrical load may discharge from $-V_A$ to $-kV_A$, and the intermediary voltage supply may recapture this energy. The fifth switch may be opened and the sixth switch may be closed, disconnecting the electrical load from the intermediary voltage supply and connecting the electrical load to ground. The electrical load may discharge from $-kV_A$ to 0V to ground.

The switches may be any suitable mechanical, electrical, or electronic switching devices. For example, the switches may be implemented using any suitable transistors. The switches may be controlled in any suitable manner, for example, based on signals from any suitable electrical or electronic device or computing system. The time between the opening and closing of switches in the H-bridge circuit may be set so that the electrical load charges or discharges to a desired voltage level before the switches change whether the electrical load is connected to the primary voltage supply, and intermediate voltage supply, or the ground. The electrical load may be any suitable reactive load, including capacitive and inductive loads, and may include any suitable device or component. The electrical load may be, for example, an electric motor, a capacitor, or a transducer, including a piezoelectric transducer, or other suitable electromechanical device.

FIGS. 1A-1F show an example circuit suitable for electrical circuit switching according to an implementation of the disclosed subject matter. An H-bridge circuit 100 may include a first switch (S1) 121, a second switch (S2) 122, a third switch (S3) 123, and a fourth switch (S4) 124, a primary voltage supply 105, and an electrical load 110. The first switch (S1) 121, second switch (S2) 122, third switch (S3) 123, and fourth switch (S4) 124 may be any suitable switching devices, including mechanical, electromechanical, electrical, or electronic switches. The primary voltage supply 105 may be any suitable source of current, including, for example, a DC current or any other type of current, which may be supplied at a voltage of $V_A$. For example, the primary voltage supply 105 may be a battery or a capacitor, or may be the output from a rectifier connected to an AC voltage, such as pulsed DC current. The electrical load 110 may be any suitable electromechanical device which may act as a capacitive or reactive load, such as, for example, a capacitor, an electric motor, or a transducer. For example, the electrical load 110 may be a capacitor C. As depicted in FIG. 1A, all of the switches of the H-bridge circuit 100 may be open before a switching sequence starts.

Figure 1B:
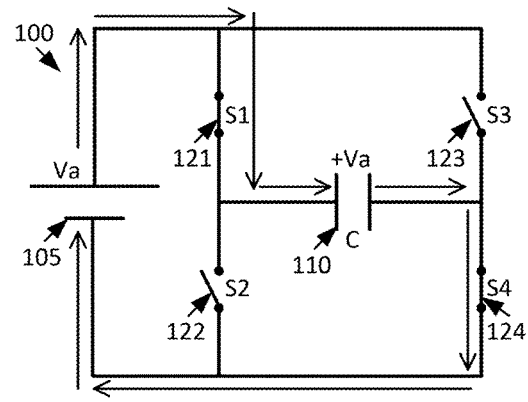

As depicted in FIG. 1B, a switching sequence may start with the first switch (S1) 121 and the fourth switch (S2) 122 closed, and the other switches open. Positive current may flow from the positive terminal of the primary voltage supply 105 through the first switch (S1) 121 and to a first terminal of the electrical load 110, with the return path from the second terminal of the electrical load 110 going through the fourth switch (S4) 124 before returning to the negative terminal of the primary voltage supply 105. The electrical load 110 may charge until the voltage of the electrical load 110, which may be $V_C$, equalizes with the voltage of the primary voltage supply 105, such that $V_C=+V_A$. For example, if the primary voltage supply 110 is capable of maintaining $V_A=5V$, then $V_C$ may charge to +5V.

Figure 1C:
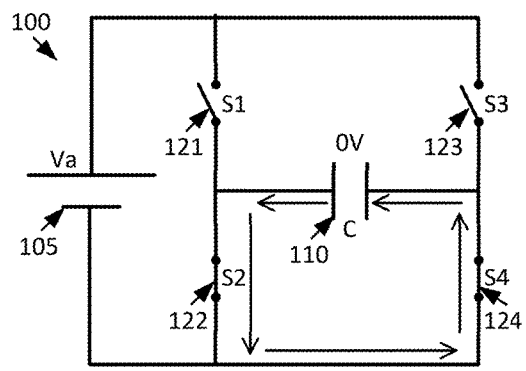

As depicted in FIG. 1C, after the electrical load 110 is charged to the desired level, for example, after some set period of time, the first switch (S1) 121 may be opened. This may disconnect the electrical load 110 from the primary voltage supply 105. The second switch (S2) may be closed. Current may flow out of the electrical load 110 as it discharges from $V_A$ to 0V into the ground, which may provide a sink for the charge from the electrical load 110. When the electrical load 110 has completed discharging, $V_C=0V$.

Figure 1D:
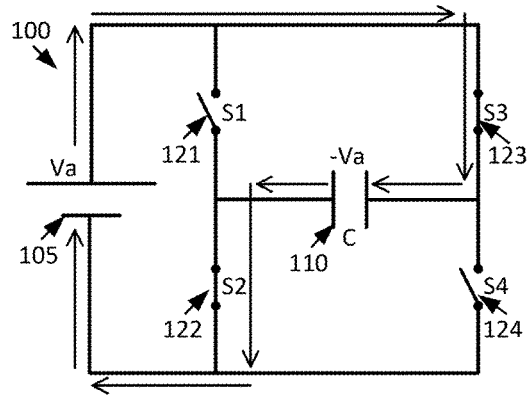

As depicted in FIG. 1D, after the electrical load 110 is discharged to the desired level, which may be 0V, for example, after some set period of time, the fourth switch (S4) 124 may be opened. This may disconnect the circuit between the first terminal and the second terminal of the electrical load 110 through ground without another voltage source. The third switch (S3) 123 may be closed. Positive current may flow from the positive terminal of the primary voltage supply 105 through the third switch (S3) 123 and to the second terminal of the electrical load 110, with the return path from the first terminal of the electrical load 110 going through the second switch (S2) 122 before returning to the negative terminal of the primary voltage supply 105. The current may flow in the opposite direction, relative to the terminals of the electrical load 110, then the current flow depicted in FIG. 1B. The electrical load 110 may charge until the voltage of the electrical load 110 equalizes with the voltage of the primary voltage supply 105, such that $V_C=-$ $V_A$. For example, if the primary voltage supply 110 is capable of maintaining $V_A=5V$, then $V_C$ may charge to $-5V$.

Figure 1E:
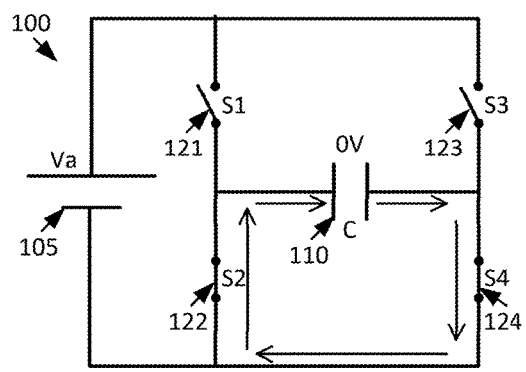
Figure 1F:
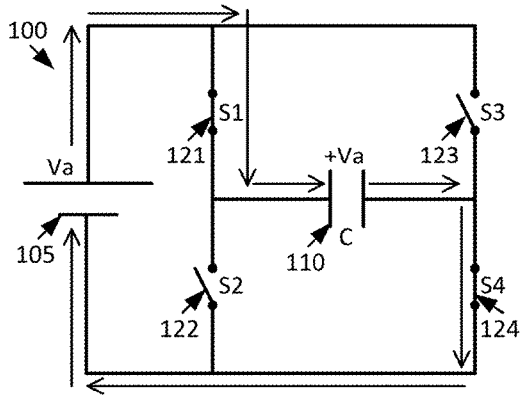

As depicted in FIG. 1E, after the electrical load 110 is charged to the desired level, for example, after some set period of time, the third switch (S3) 123 may be opened. This may disconnect the electrical load 110 from the primary voltage supply 105. The second switch (S2) may be closed. Current may flow out of the electrical load 110 as it discharges from $-V_A$ to 0V to ground, which may provide a sink for the charge from the electrical load 110. When the electrical load 110 has completed discharging, $V_C=0V$. This may complete a single switching sequence cycle of the H-bridge circuit 100, as the voltage of the electrical load may have swung from 0V to $V_A$ to $-V_A$ to 0V.

As depicted in FIG. 1E, the switching sequence may being again after the completion of the switching cycle. The second switch (S2) 122 may be opened and the first switch (S1) 121 may be closed, resulting in the same configuration of opened and closed switches as depicted in FIG. 1B, with the same effect on the charging of the electrical load 110 from the primary voltage supply.

Figure 2A:
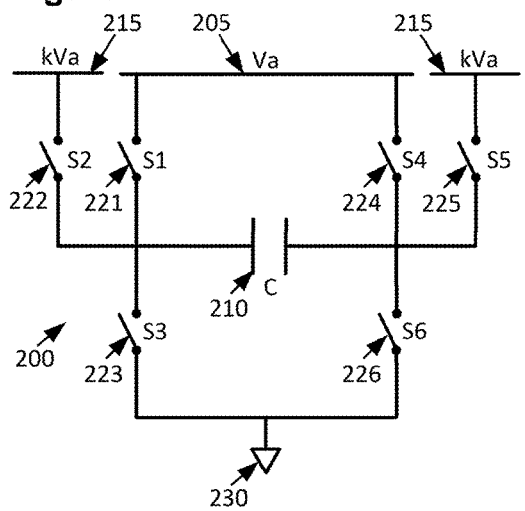
FIGS. 2A-J show an example circuit suitable for electrical circuit switching according to an implementation of the disclosed subject matter.

FIGS. 2A-J show an example circuit suitable for electrical circuit switching according to an implementation of the disclosed subject matter. An H-bridge circuit 200 may include a modified driver circuit and an intermediary voltage supply. The H-bridge circuit 200 include a first switch (S1) 221, a second switch (S2) 222, a third switch (S3) 223, and a fourth switch (S4) 224, a fifth switch (S5) 225, a sixth switch (S6) 226, a primary voltage supply 205, an intermediary voltage supply 215, ground 230, and an electrical load 210. The first switch (S1) 221, second switch (S2) 222, third switch (S3) 223, fourth switch (S4) 224, fifth switch (S5) 225 and sixth switch (S6) 226 may be any suitable switching devices, including mechanical, electromechanical, electrical, or electronic switches. The primary voltage supply 205 may be any suitable source of current, including, for example, a DC current or any other type of current, which may be supplied at a voltage of $V_A$, and may be grounded at its negative terminal. For example, the primary voltage supply 205 may be a battery or a capacitor, or may be the output from a rectifier connected to an AC voltage, such as pulsed DC current. The intermediary voltage supply 215 may be any suitable source of current, including, for example, a DC current or any other type of current, which may be supplied at a voltage $kV_A$, and may also be suitable for storing charge returned from the electrical load 210. For example, the intermediary voltage supply 215 may be a battery or capacitor. The electrical load 210 may be any suitable electromechanical device which may act as a capacitive or reactive load, such as, for example, a capacitor, an electric motor, or a transducer. For example, the electrical load 210 may be a capacitor C. As depicted in FIG. 2A, all of the switches of the H-bridge circuit 200 may be open before a switching sequence starts.

Figure 2B:
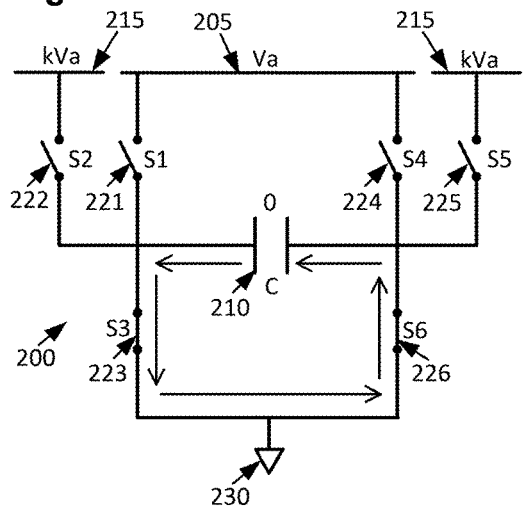

As depicted in FIG. 2B, a switching sequence may start with the third switch (S3) 223 and the sixth switch (S6) 226 closed, and the other switches open. If the electrical load 210 has any charge, current may flow out of the electrical load 210 as it discharges to 0V into the to ground 230 which may provide a sink for the charge from the electrical load 210. When the electrical load 210 has completed discharging, $V_C=0V$.

Figure 2C:
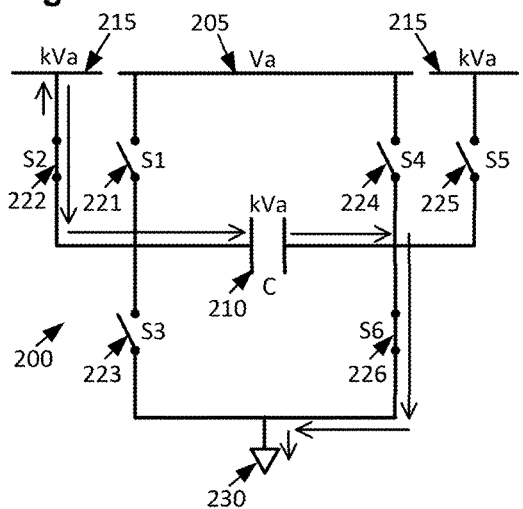

As depicted in FIG. 2C, after the electrical load 210 is discharged to the desired level, which may be 0V, for example, after some set period of time, the third switch (S3) 223 may be opened, and the second switch (S2) 222 may be closed. Positive current may flow from the first terminal of the intermediary voltage supply 215 through the second switch (S2) 222 and to a first terminal of the electrical load 210, with the return path from the second terminal of the electrical load 210 going through the sixth switch (S6) 226 the ground 230 before returning to the second terminal of the intermediary voltage supply 215 through the ground. The electrical load 210 may charge until the voltage of the electrical load 210, which may be $V_C$, equalizes with the voltage of the intermediary voltage supply 215, such that $V_C=+kV_A$.

Figure 2D:
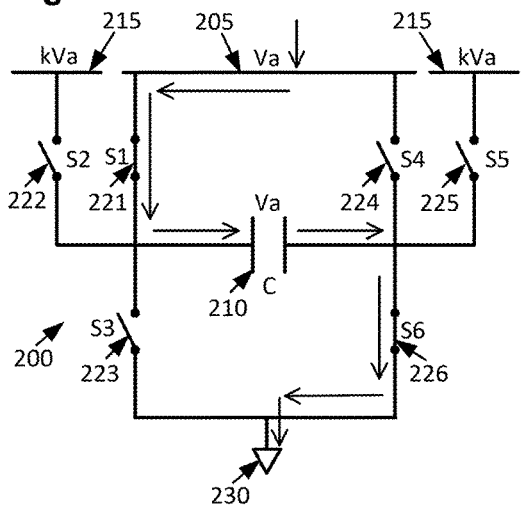

As depicted in FIG. 2D, after the electrical load 210 is charged to the desired level, which may be $+kV_A$, for example, after some set period of time, the second switch (S2) 222 may be opened. This may disconnect the electrical load 210 from the intermediary voltage supply 215. The first switch (S1) 221 may be closed. Positive current may flow from the positive terminal of the primary voltage supply 205 through the first switch (S1) 221 and to the first terminal of the electrical load 210, with the return path from the second terminal of the electrical load 210 going through the sixth switch (S6) 226 and the ground 230 before returning to the negative terminal of the primary voltage supply 205 through the ground. The current may flow in the same direction, relative to the terminals of the electrical load 210, as the current flow depicted in FIG. 2C. The electrical load 210 may charge from $+kV_A$ until the voltage of the electrical load 210 equalizes with the voltage of the primary voltage supply 205, such that $V_C=+V_A$.

Figure 2E:
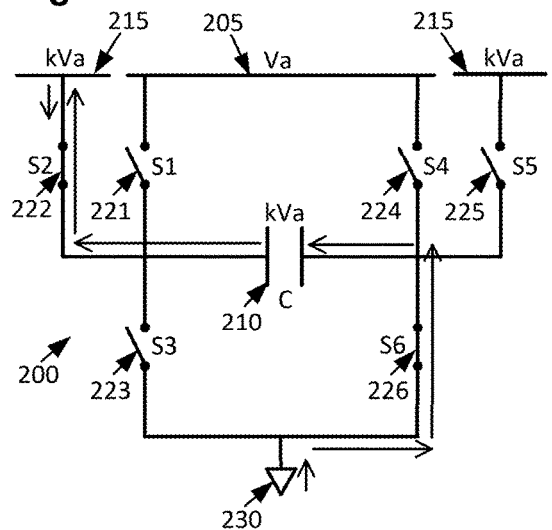

As depicted in FIG. 2E, after the electrical load 210 is charged to the desired level, which may be $+V_A$, for example, after some set period of time, the first switch (S1) 221 may be opened, and the second switch (S2) 222 may be closed. Positive current may flow from the first terminal of the electrical load 210 through the second switch (S2) 222 and to a first terminal of the intermediary voltage supply 215, with the return path from the second terminal of the intermediary voltage supply 215 going through the ground 230 and the sixth switch (S6) 226 before returning to the second terminal of electrical load 210. The electrical load 210 may discharge into the intermediary voltage supply 215 until the voltage of the electrical load 210 equalizes with the voltage of the intermediary voltage supply 215, such that $V_C=+kV_A$. The intermediary voltage supply 215 may store the energy discharged from the electrical load 210.

Figure 2F:
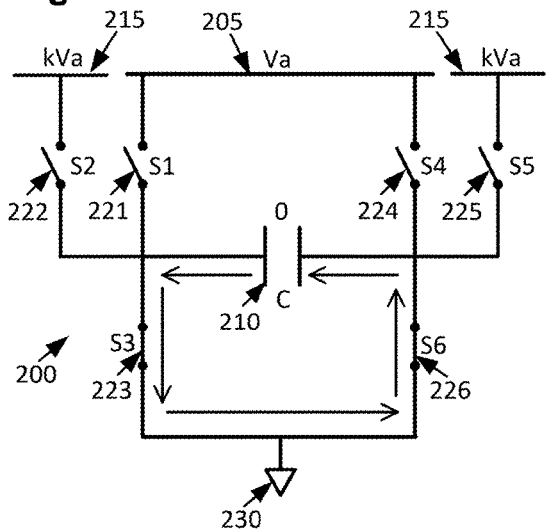

As depicted in FIG. 2F, after the electrical load 210 is discharged to the desired level, which may be $+kV_A$, for example, after some set period of time, the second switch (S2) 222 may be opened, and the third switch (S3) 223 may be closed. This may disconnect the electrical load 210 form the intermediary voltage supply 215, and connect the electrical load 210 ground between its first and second terminals. Current may flow out of the electrical load 210 as it discharges to 0V into the ground 230, which may provide a sink for the charge from the electrical load 210. When the electrical load 210 has completed discharging, $V_C=0V$. This may complete half of the switching sequence cycle for the H-bridge circuit 200.

Figure 2G:
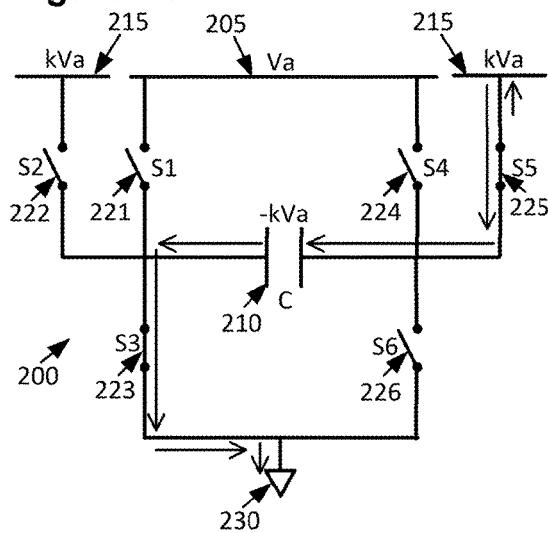

As depicted in FIG. 2G, after the electrical load 210 is discharged to the desired level, which may be 0V, for example, after some set period of time, the sixth switch (S6) 226 may be opened, and the fifth switch (S5) 225 may be closed. Positive current may flow from the first terminal of the intermediary voltage supply 215 through the fifth switch (S5) 225 and to the second terminal of the electrical load 210, with the return path from the first terminal of the electrical load 210 going through the third switch (S3) 223 and the ground 230 before returning to the second terminal of the intermediary voltage supply 215 through the ground. The current may flow in the opposite direction of the current flow depicted in FIG. 2C. The electrical load 210 may charge until the voltage of the electrical load 210, which may be $V_C$, equalizes with the voltage of the intermediary voltage supply 215, such that $V_C=-kV_A$. The energy used to charge the electrical load 210 from the intermediary voltage supply 215 may be the energy the intermediary voltage supply 215 received from electrical load 210, for example, as depicted in FIG. 2E.

Figure 2H:
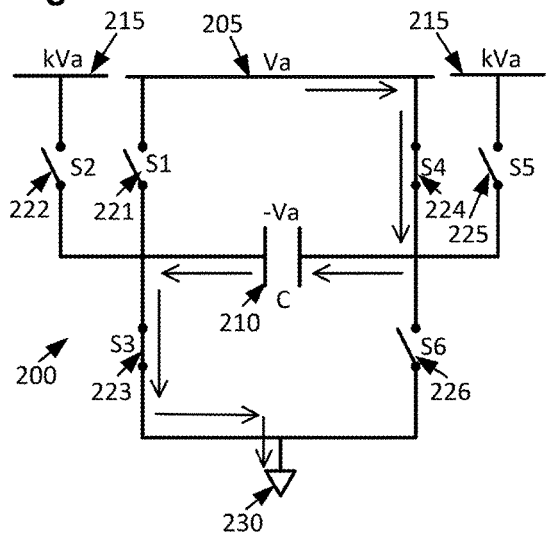

As depicted in FIG. 2H, after the electrical load 210 is charged to the desired level, which may be $-kV_A$, for example, after some set period of time, the fifth switch (S5) 225 may be opened. This may disconnect the electrical load 210 from the intermediary voltage supply 215. The fourth switch (S4) 224 may be closed. Positive current may flow from the positive terminal of the primary voltage supply 205 through the fourth switch (S4) 224 and to the second terminal of the electrical load 210, with the return path from the first terminal of the electrical load 210 going through the three switch (S3) 223 and the ground 230 before returning to the negative terminal of the primary voltage supply 205 through the ground. The current may flow in the same direction, relative to the terminals of the electrical load 210, as the current flow depicted in FIG. 2G. The electrical load 210 may charge from $-kV_A$ until the voltage of the electrical load 210 equalizes with the voltage of the primary voltage supply 205, such that $V_C=-V_A$.

Figure 2I:
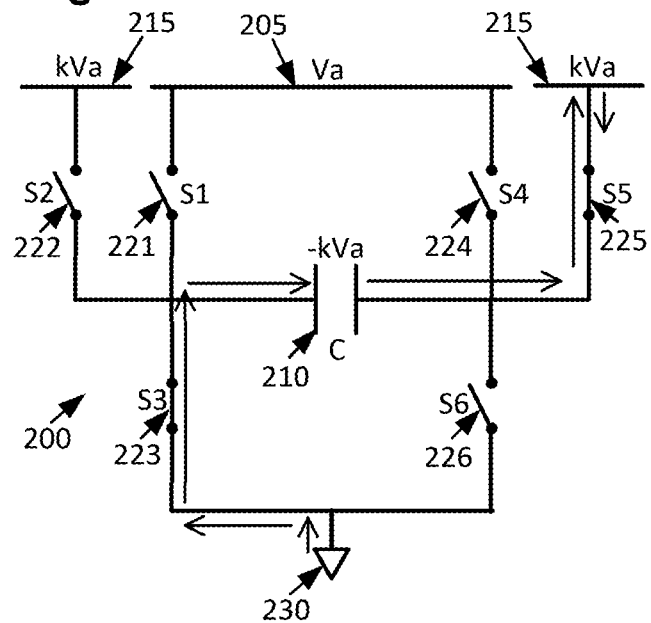

As depicted in FIG. 2I, after the electrical load 210 is charged to the desired level, which may be $-V_A$, for example, after some set period of time, the fourth switch (S4) 224 may be opened, and the fifth switch (S5) 225 may be closed. Positive current may flow from the second terminal of the electrical load 210 through the fifth switch (S5) 225 and to a first terminal of the intermediary voltage supply 215, with the return path from the second terminal of the intermediary voltage supply 215 going the ground 230 and the third switch (S3) 223 before returning to the first terminal of electrical load 210. The electrical load 210 may discharge into the intermediary voltage supply 215 until the voltage of the electrical load 210 equalizes with the voltage of the intermediary voltage supply 215, such that $V_C=-kV_A$. The intermediary voltage supply 215 may store the energy discharged from the electrical load 210.

Figure 2J:
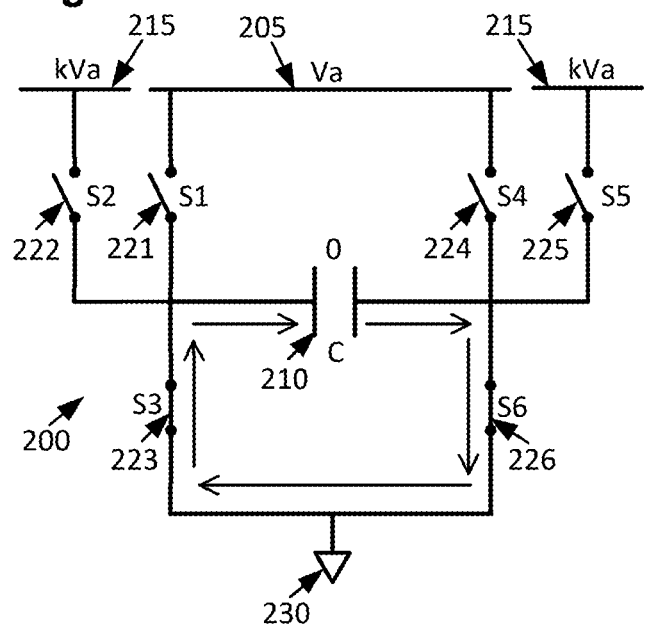

As depicted in FIG. 2J, after the electrical load 210 is discharged to the desired level, which may be $-kV_A$, for example, after some set period of time, the second switch (S2) 222 may be opened, and the third switch (S3) 223 may be closed. This may disconnect the electrical load 210 form the intermediary voltage supply 215, and connect the electrical load 210 to ground between its first terminal and second terminal without another voltage source. Current may flow out of the electrical load 210 as it discharges to 0V into the ground 230, which may provide a sink for the charge from the electrical load 210. When the electrical load 210 has completed discharging, $V_C=0V$. This may complete the switching sequence cycle for the H-bridge circuit 200. During the next switching sequence cycle for the H-bridge circuit 200, the energy used to charge the electrical load 210 from the intermediary voltage supply 215, for example, as depicted in FIG. 2C, may be the energy stored from the electrical load 210, for example, as depicted in FIG. 2I.

Figure 3:
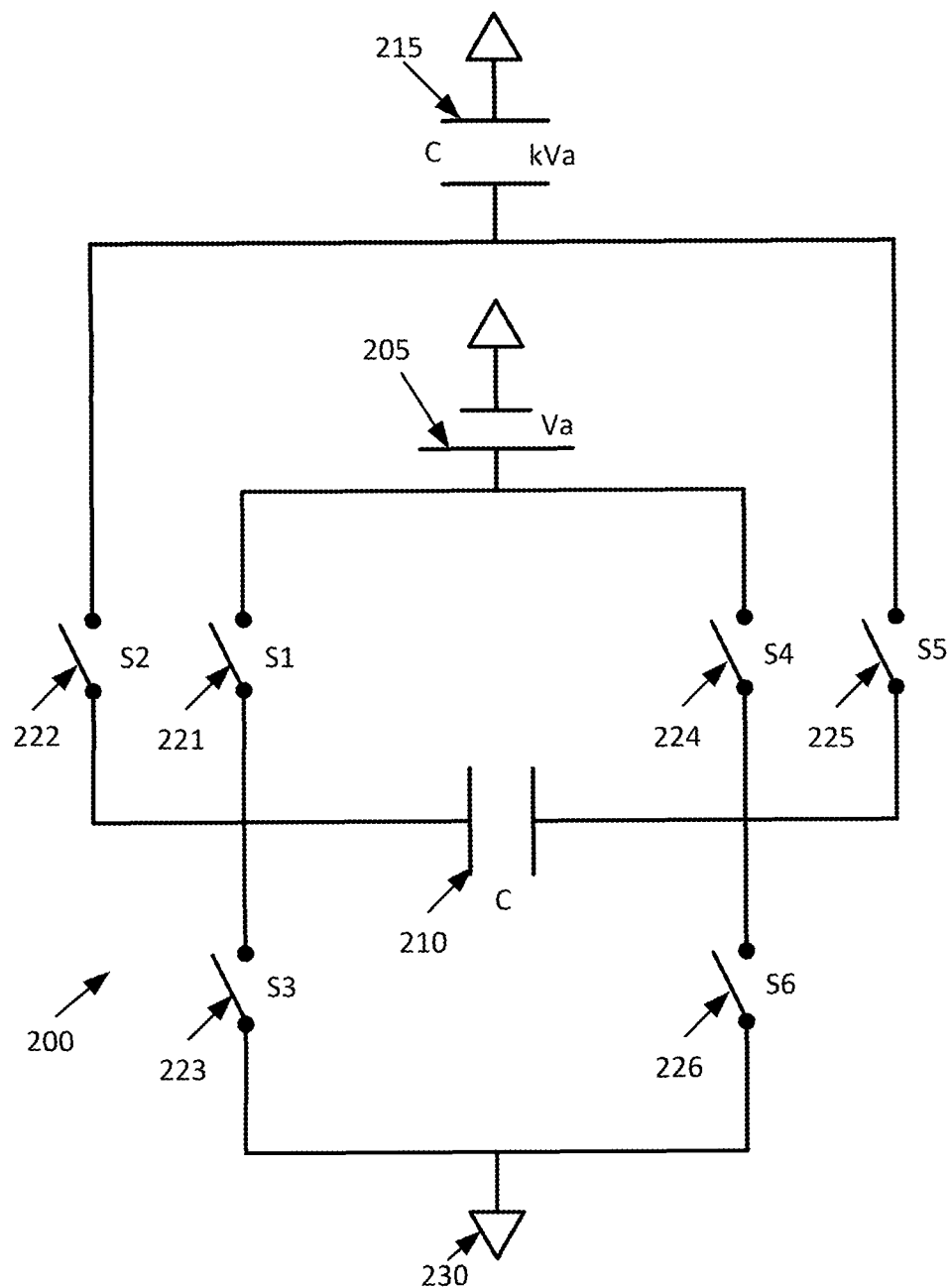
FIG. 3 shows an example circuit suitable for electrical circuit switching according to an implementation of the disclosed subject matter.

FIG. 3 shows an example circuit suitable for electrical circuit switching according to an implementation of the disclosed subject matter. The H-bridge circuit 200 may include the intermediary voltage supply 215. The first terminal of the intermediary voltage supply 215 may be connected to the first terminal of the electrical load 210 through the second switch (S2) 222, and to the second terminal of the electrical load 210 through the fifth switch (S5) 225. The second terminal of the intermediary voltage supply 215 may be connected to ground. The negative terminal of the primary voltage supply 205 may also be connected to ground. In some implementations, the third switch (S3) 223, sixth switch (S6) 226, primary voltage supply 215, and intermediary voltage supply 215 may be connected to the ground 230.

Figure 4:
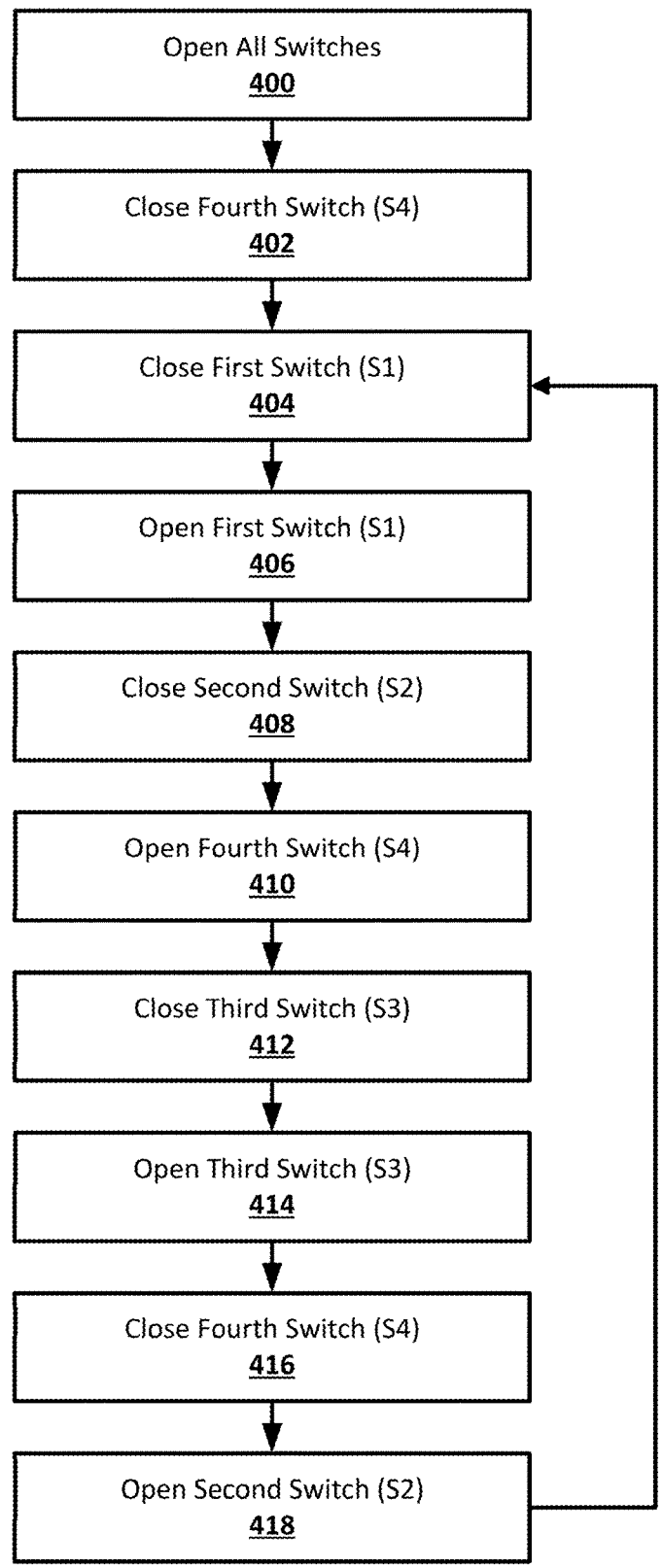
FIG. 4 shows an example procedure suitable for electrical circuit switching according to an implementation of the disclosed subject matter.

FIG. 4 shows an example procedure suitable for electrical circuit switching according to an implementation of the disclosed subject matter. At 400, all switches may be open. For example, the first switch (S1) 121, second switch (S2) 122, third switch (S3) 123, and fourth switch (S4) 124 of the H-bridge circuit 100 may all be open.

At 402, a fourth switch (S4) may be closed. For example, the fourth switch (S4) 124 of the H-bridge circuit 100 may be closed.

At 404, a first switch (S1) may be closed. For example, the first switch (S1) 121 may be closed, connecting the electrical load 110 to the primary voltage supply 105. The electrical load 110 may charge to $+V_A$.

At 406, the first switch (S1) may be opened. For example, the first switch (S1) 121 may be opened, disconnecting the electrical load 110 from the primary voltage supply 105.

At 408, a second switch (S2) may be closed. For example, the second switch (S2) 122 may be closed, connecting the electrical load 110 to ground. The electrical load 110 may discharge to 0V.

At 410, the fourth switch (S4) may be opened. For example, the fourth switch (S4) 124 may be opened, breaking the connection to ground between the terminals of the electrical load 110.

At 412, a third switch (S3) may be closed. For example, the third switch (S3) 123 may be closed, connecting the electrical load 110 to the primary voltage supply 105. The electrical load 110 may charge to $-V_A$.

At 414, the third switch (S3) may be opened. For example, the third switch (S3) 123 may be opened, disconnecting the electrical load 110 from the primary voltage supply 105.

At 416, the fourth switch (S4) may be closed. For example, the fourth switch (S4) 124 may be closed, connecting the electrical load 110 to ground. The electrical load 110 may discharge to 0V.

At 418, the second switch (S2) may be opened. For example, the second switch (S2) 122 may be opened, breaking the connection to ground between the terminals of the electrical load 110. This may complete one switching sequence cycle for the H-bridge circuit 100. Flow may proceed back to 404, where the first switch (S1) 121 may again be closed, reconnecting the electrical load 110 to the primary voltage supply 105. The switching sequence for the H-bridge circuit 100 may be looped indefinitely for as long as the H-bridge circuit 100 is operational.

Figure 5:
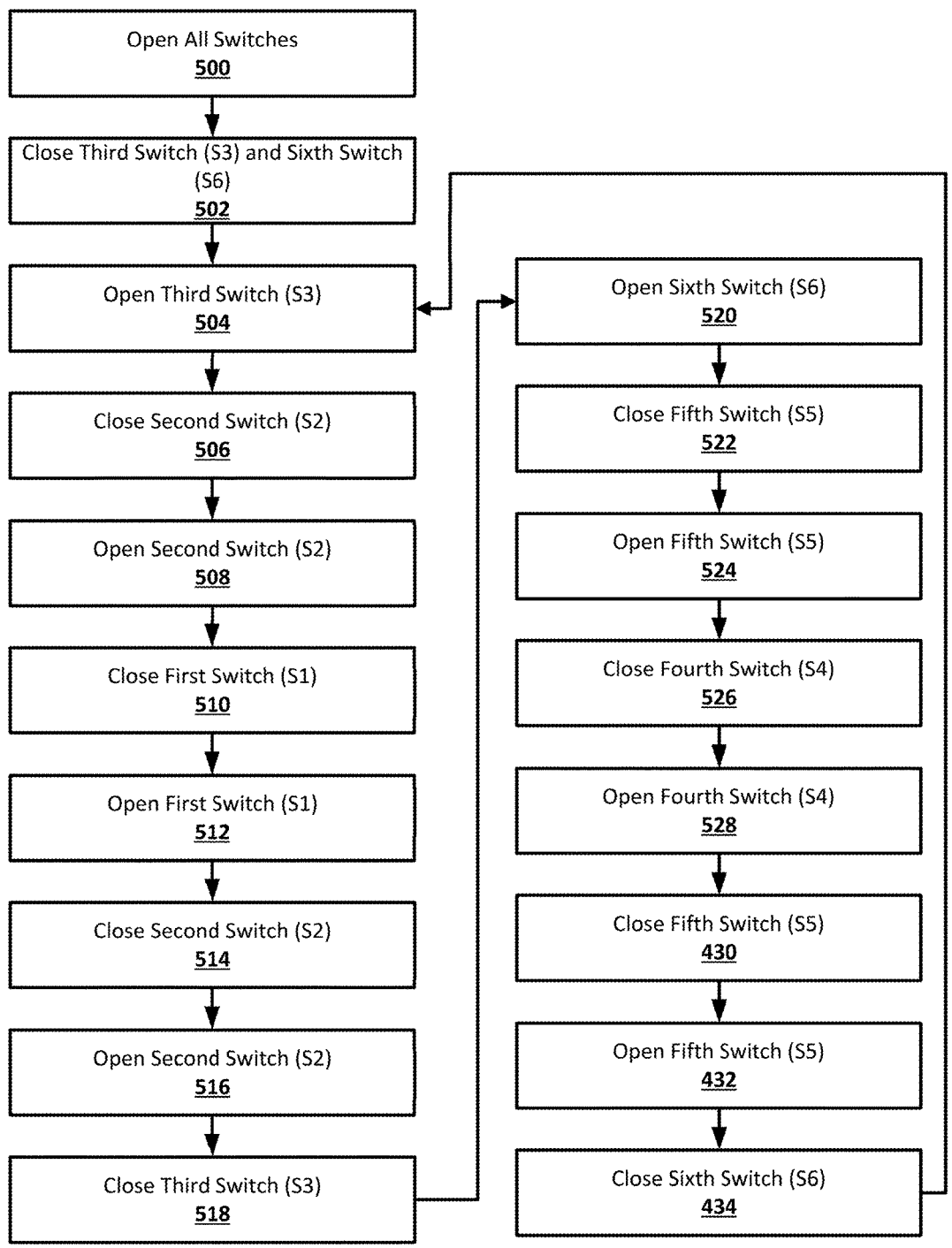
FIG. 5 shows an example procedure suitable for electrical circuit switching according to an implementation of the disclosed subject matter.

FIG. 5 shows an example procedure suitable for electrical circuit switching according to an implementation of the disclosed subject matter. At 500, all switches may be open. For example, the first switch (S1) 221, second switch (S2) 222, third switch (S3) 223, fourth switch (S4) 224, fifth switch (S5) 225, and sixth switch (S6) 226 of the H-bridge circuit 200 may all be open.

At 502, a third switch (S3) and a sixth switch (S6) may be closed. For example, the third switch (S3) 223 and the sixth switch (S6) 226 of the H-bridge circuit 200 may be closed, connecting the electrical load 210 to a ground. The electrical load 210 may discharge to 0V.

At 504, the third switch (S3) may be opened. For example, the third switch (S3) 223 may be opened, breaking the connection to ground between the terminals of the electrical load 210.

At 506, a second switch (S2) may be closed. For example, the second switch (S2) 222 may be closed, connecting the electrical load 210 to the intermediary voltage supply 215. The electrical load 210 may charge to $+kV_A$.

At 508, the second switch (S2) may be opened. For example, the second switch (S2) 222 may be opened, disconnecting the electrical load 210 from the intermediary voltage supply 215.

At 510, a first switch (S1) may be closed. For example, the first switch (S1) 221 may be closed, connecting the electrical load 210 to the primary voltage supply 205. The electrical load 210 may charge from $+kV_A$ to $+V_A$.

At 512, the first switch (S1) may be opened. For example, the first switch (S1) 221 may be opened, disconnecting the electrical load 210 from the primary voltage supply 205.

At 514, the second switch (S2) may be closed. For example, the second switch (S2) 222 may be closed, connecting the electrical load 210 to the intermediary voltage supply 215. The electrical load 210 may discharge from $+V_A$ to $+kV_A$, with the discharged energy being stored by the intermediary voltage supply 215.

At 516, the second switch (S2) may be opened. For example, the second switch (S2) 222 may be opened, disconnecting the electrical load 210 from the intermediary voltage supply 215.

At 518, the third switch (S3) may be closed. For example, the third switch (S3) 223 may be closed, connecting the electrical load 210 to a ground. The electrical load 210 may discharge from $+kV_A$ to 0V. This may complete half of the switching sequence cycle.

At 520, the sixth switch (S6) may be opened. For example, the sixth switch (S6) 226 may be opened, breaking the connection to ground between the terminals of the electrical load 210.

At 522, a fifth switch (S5) may be closed. For example, the fifth switch (S5) 225 may be closed, connecting the electrical load 210 to the intermediary voltage supply 215. The electrical load 210 may charge to $-kV_A$. The energy used to charge the electrical load 210 may be the energy stored wen the electrical load 210 discharged into the intermediary voltage supply 215.

At 524, the fifth switch (S5) may be opened. For example, the fifth switch (S5) 225 may be opened, disconnecting the electrical load 210 from the intermediary voltage supply 215.

At 526, a fourth switch (S4) may be closed. For example, the fourth switch (S4) 224 may be closed, connecting the electrical load 210 to the primary voltage supply 205. The electrical load 210 may charge from $-kV_A$ to $-V_A$.

At 528, the fourth switch (S4) may be opened. For example, the fourth switch (S4) 224 may be opened, disconnecting the electrical load 210 from the primary voltage supply 205.

At 530, the fifth switch (S5) may be closed. For example, the fifth switch (S5) 225 may be closed, connecting the electrical load 210 to the intermediary voltage supply 215. The electrical load 210 may discharge from $-V_A$ to $-kV_A$, with the discharged energy being stored by the intermediary voltage supply 215.

At 532, the fifth switch (S5) may be opened. For example, the fifth switch (S5) 225 may be opened, disconnecting the electrical load 210 from the intermediary voltage supply 215.

At 534, the sixth switch (S6) may be closed. For example, the sixth switch (S6) 226 may be closed, connecting the electrical load 210 to ground. The electrical load 210 may discharge from $-kV_A$ to 0V. This may complete the switching sequence cycle for the H-bridge circuit 200. Flow may proceed back to 504, were another switching sequence cycle may begin. The switching sequence for the H-bridge circuit 200 may be looped indefinitely for as long as the H-bridge circuit 200 is operational.

Figure 6:
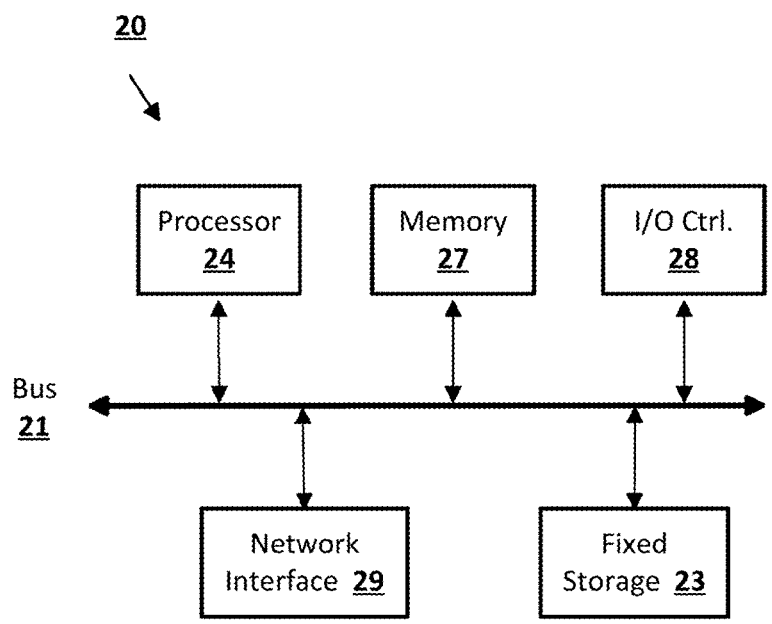
FIG. 6 shows a computer according to an embodiment of the disclosed subject matter.

Embodiments of the presently disclosed subject matter may be implemented in and used with a variety of component and network architectures. FIG. 6 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 7.

Many other devices or components (not shown) may be connected in a similar manner, such as document scanners, digital cameras, auxiliary, supplemental, or backup systems, or the like. Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 7:
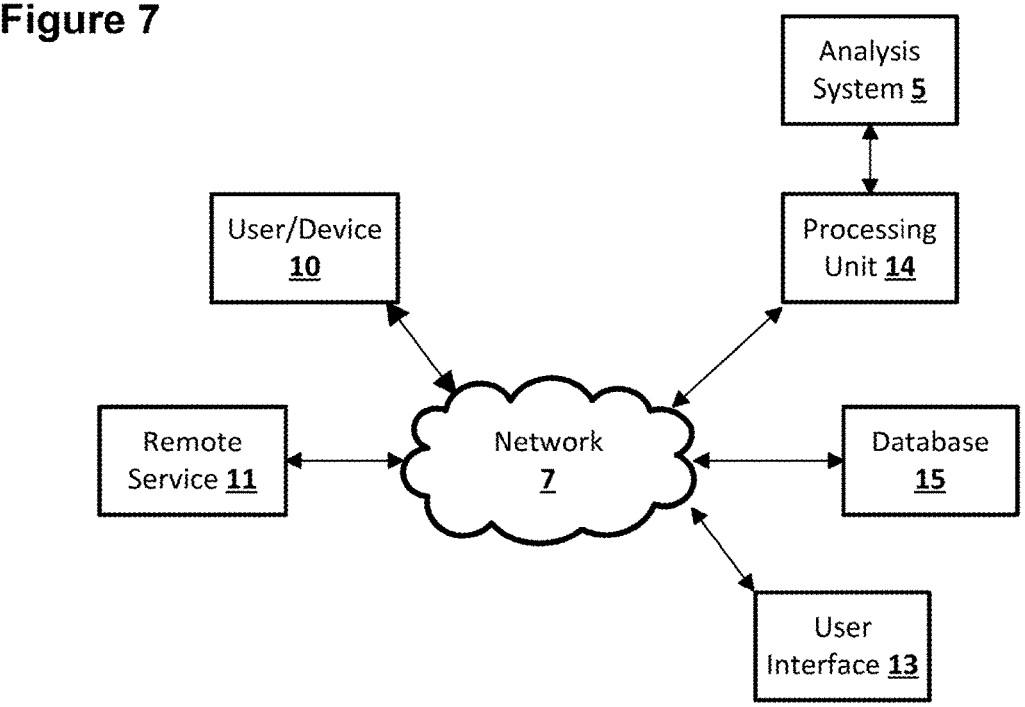
FIG. 7 shows a network configuration according to an embodiment of the disclosed subject matter.

FIG. 7 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   connecting an electrical load to an intermediate voltage supply with current flow entering a first terminal of the electrical load;
   disconnecting the electrical load from the intermediate voltage supply;
   connecting the electrical load to a primary voltage supply with current flow entering the first terminal of the electrical load;
   disconnecting the electrical load from the primary voltage supply;
   connecting the electrical load to the intermediate voltage supply with current flow entering the intermediate voltage supply from the first terminal of the electrical load;
   disconnecting the electrical load from the intermediate voltage supply;
   connecting the electrical load to ground such that the electrical load discharges;
   connecting the electrical load to the intermediate voltage supply with current flow entering a second terminal of the electrical load;
   disconnecting the electrical load from the intermediate voltage supply;
   connecting the electrical load to the primary voltage supply with current flow entering the second terminal of the electrical load;
   disconnecting the electrical load from the primary voltage supply;
   connecting the electrical load to the intermediate voltage supply with current flow entering the intermediate voltage supply from the second terminal of the electrical load;
   disconnecting the electrical load from the intermediate voltage supply; and
   connecting the electrical load to ground such that the electrical load discharges.

2. The method of claim 1, wherein the method comprises a switching sequence.

3. The method of claim 2, further comprising repeating the switching sequence one or more times.

4. The method of claim 1, wherein the primary voltage supply supplies a DC current.

5. The method of claim 1, wherein connecting an electrical load to an intermediate voltage supply with current flow entering a first terminal of the electrical load comprises:
   closing a second switch between the intermediate voltage supply and the first terminal of the electrical load and either:
   closing a sixth switch between a second terminal of the electrical load and ground if the sixth switch is open, or
   opening a third switch between the first terminal of the electrical load and ground if the sixth switch is closed.

6. The method of claim 5, wherein disconnecting the electrical load from the intermediary voltage supply comprises opening the second switch.

7. The method of claim 6, wherein connecting the electrical load to a primary voltage supply with current flow entering the first terminal of the electrical load comprises closing a first switch between the primary voltage supply and the first terminal of the electrical load.

8. The method of claim 7, wherein disconnecting the electrical load from the primary voltage supply comprises opening the first switch.

9. The method of claim 8, wherein connecting the electrical load to the intermediate voltage supply with current flow entering the intermediate voltage supply from the first terminal of the electrical load comprises closing the second switch.

10. The method of claim 9, wherein disconnecting the electrical load from the intermediate voltage supply comprises opening the second switch.

11. The method of claim 10, wherein connecting the electrical load to ground such that the electrical load discharges comprises closing a third switch between the first terminal of the electrical load and the ground.

12. The method of claim 11, wherein connecting the electrical load to the intermediate voltage supply with current flow entering the second terminal of the electrical load comprises:
   closing a fifth switch between the intermediate voltage supply and the second terminal of the electrical load; and
   opening the sixth switch.

13. The method of claim 12, wherein disconnecting the electrical load from the intermediary voltage supply comprises opening the fifth switch.

14. The method of claim 13, wherein connecting the electrical load to the primary voltage supply with current flow entering the second terminal of the electrical load comprises closing a fourth switch between the primary voltage supply and the second terminal of the electrical load.

15. The method of claim 14, wherein disconnecting the electrical load from the primary voltage supply comprises opening the fourth switch.

16. The method of claim 15, wherein connecting the electrical load to the intermediate voltage supply with current flow entering the intermediate voltage supply from the second terminal of the electrical load comprises closing the fifth switch.

17. The method of claim 16, wherein disconnecting the electrical load from the intermediate voltage supply comprises opening the fifth switch.

18. The method of claim 17, wherein connecting the electrical load to ground such that the electrical load discharges comprises closing the sixth switch.

* * * * *